(12) United States Patent
Sohn et al.

(10) Patent No.: US 8,581,882 B2
(45) Date of Patent: Nov. 12, 2013

(54) TOUCH PANEL DISPLAY DEVICE

(75) Inventors: Min Ho Sohn, Gyeonggi-do (KR); Jong Seong Choi, Gyeonggi-do (KR); Hyung Uk Jang, Gyeonggi-do (KR); Sang Rae Lee, Gyeongsangbuk-do (KR); Sang Hyuck Bae, Seoul (KR); Byung Chun Yu, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 583 days.

(21) Appl. No.: 12/232,951

(22) Filed: Sep. 26, 2008

(65) Prior Publication Data

US 2009/0141002 A1 Jun. 4, 2009

(30) Foreign Application Priority Data

Dec. 3, 2007 (KR) .................. 10-2007-0124168

(51) Int. Cl.
*G06F 3/042* (2006.01)

(52) U.S. Cl.
USPC .................. 345/175; 345/173; 345/156

(58) Field of Classification Search
USPC .................................................. 345/175
See application file for complete search history.

(56) References Cited

U.S. PATENT DOCUMENTS

| | | | | |
|---|---|---|---|---|
| 4,247,858 A | * | 1/1981 | Eichweber | 343/729 |
| 4,695,827 A | * | 9/1987 | Beining et al. | 341/31 |
| 5,579,035 A | * | 11/1996 | Beiswenger | 345/169 |
| 6,043,861 A | * | 3/2000 | Davis | 349/193 |
| 6,357,904 B1 | * | 3/2002 | Kawashima | 362/555 |
| 6,783,269 B2 | | 8/2004 | Pashley et al. | |
| 6,972,401 B2 | | 12/2005 | Akitt et al. | |
| 7,099,553 B1 | | 8/2006 | Graham et al. | 385/146 |
| 2002/0145593 A1 | * | 10/2002 | Boyd et al. | 345/173 |
| 2004/0109632 A1 | * | 6/2004 | Gruhlke et al. | 385/16 |
| 2004/0140960 A1 | * | 7/2004 | Cok | 345/175 |
| 2004/0149892 A1 | * | 8/2004 | Akitt et al. | 250/221 |
| 2005/0254556 A1 | | 11/2005 | Fujii et al. | 375/144 |
| 2006/0001653 A1 | * | 1/2006 | Smits | 345/176 |

(Continued)

FOREIGN PATENT DOCUMENTS

| | | |
|---|---|---|
| DE | 103 60 952 | 7/2005 |
| JP | 2003280802 A | 10/2003 |
| JP | 2004-295644 | 10/2004 |
| TW | 200720785 | 6/2007 |

OTHER PUBLICATIONS

TW Office Action issued Apr. 12, 2013.

*Primary Examiner* — Quan-Zhen Wang
*Assistant Examiner* — David Lee
(74) *Attorney, Agent, or Firm* — Morgan, Lewis & Bockius LLP

(57) ABSTRACT

A touch panel display device includes a liquid crystal panel to display an image by regulating transmittance of light supplied from a back light unit, and a touch sensing part provided on upper edges of the liquid crystal panel in order to detect a position touched by a user or an object. The touch sensing part includes infrared lamps to generate and emit infrared light, infrared light reflecting tubes mounted with the infrared lamps, and image sensors to sense the infrared light output from the light output regions of the infrared light reflecting tubes. Each of the infrared light reflecting tubes has light output regions and non-output regions evenly formed at a surface facing an upper surface of the liquid crystal panel so that the infrared light emitted from the infrared lamps is evenly irradiated on the upper surface of the liquid crystal panel.

10 Claims, 9 Drawing Sheets

(56) References Cited

U.S. PATENT DOCUMENTS

2006/0097991 A1* 5/2006 Hotelling et al. ............ 345/173
2006/0202974 A1* 9/2006 Thielman ..................... 345/175
2006/0290647 A1* 12/2006 Oron et al. ................... 345/102
2008/0055494 A1 3/2008 Cernasov
2008/0074401 A1 3/2008 Chung et al.

* cited by examiner

TOUCH PANEL DISPLAY DEVICE

This application claims the benefit of Korean Patent Application No. 10-2007-0124168 filed on Dec. 3, 2007, which is hereby incorporated by reference as if fully set forth herein.

BACKGROUND OF THE INVENTION

1. Field of the Invention

The present invention relates to a touch panel display device, and more particularly, to a touch panel display device capable of decreasing power consumption and manufacturing costs by reducing the number of image sensors and infrared light emitting diodes, and capable of improving touch sensitivity even when a screen has a large scale.

2. Discussion of the Related Art

With the wide use of computers for data processing, users increasingly need to input more data to data processors, such as workstations, personal computers, etc., or need data processing (e.g., data conversion) using data processors. Diverse application programs can be applied to the recent developed data processors, and complex data processing can be achieved by combination of the application programs.

However, it is very difficult to handle the data processors. Specifically, persons having little knowledge about computers have considerable difficulty in handling data displayed on a display device. In this regard, the demand for an improved device, enabling even persons who have little knowledge about computers to easily handle the displayed data, has increased.

Generally, in order to handle the data displayed on the display device, an operator needs to input a command for processing the data by use of a keyboard or mouse, or needs to input a command to select an icon (representation of a program, file, directory or device) displayed on the display device by use of a keyboard or mouse in order to carry out a desired function. However, because it is troublesome to input a desired command using a keyboard or mouse and an icon, a user having little knowledge about computers may have difficulty in even using a keyboard or mouse.

In this regard, so as for even a user having little knowledge about computers to easily handle an apparatus such as a data processor, development of a display device having a touch panel capable of processing data by only finger touch has been required.

In general, a touch panel is one of various types of forming an interface between information and communication equipment using a display device and a user. The touch panel serves as an input device that enables a user to input desired information to the equipment by directly touching a screen with a finger or a touch pen.

There are two representative types of touch panels, one of which is a resistive type touch panel, and the other of which is an infrared touch panel.

A resistive type touch panel uses a conductive film, and is constituted such that chemicals are coated between a glass and a thin film, and a thin metal plate is attached to side surfaces in X and Y axis directions. If electric power is supplied to such a panel, a predetermined resistance is generated. If a certain portion of the panel is touched with a finger or other objects, the chemicals react to the touch, and the resistance is changed in a moment. In the metal plate provided on the side surfaces, position coordinates of the portion touched with the object are derived from the change of the resistance.

An infrared touch panel includes an infrared generating device for radiating infrared light in a cross stripe shape on a display panel, and a sensing device to sense the infrared light generated from the infrared generating device. In such an infrared touch panel, if a certain portion of the display panel is touched with a finger or other objects, the infrared light passing through the touched portion is interrupted. The sensing device such as an image sensor senses the interruption of the infrared light, and thereby position information of the touched portion is derived.

A user does not necessarily touch only the center portion of the touch panel, but touches any portion of the touch panel. In order to increase accuracy of detecting a touched position on the whole region of the touch panel, a plurality of infrared generating devices are required, and accordingly a plurality of infrared sensing devices are also required.

An example of such a conventional touch panel display device is disclosed in U.S. Pat. No. 6,972,401 (issued on Dec. 6, 2005).

FIG. 1 is a plan view illustrating a conventional touch panel display device, and FIG. 2 is a perspective view illustrating infrared light emitting diodes of the conventional touch panel display device.

Referring to FIGS. 1 and 2, a conventional touch panel display device 1 includes a liquid crystal display module having a back light unit (not shown) and a display panel 58, and touch sensing parts 68 provided above the liquid crystal display module.

The display panel 58 of the liquid crystal display module displays an image, and the back light unit of the liquid crystal display module supplies light to the display panel 58. The illustration of the back light unit is omitted in FIGS. 1 and 2.

The back light unit may include a plurality of light sources (not shown) to irradiate light to the display panel 58, a bottom cover (not shown) which is mounted with the light sources and an optical member for guiding the light emitted from the light sources to the display panel 58, a diffusion plate (not shown) to diffuse the light emitted from the light sources to the whole surface of the display panel 58, and a plurality of optical sheets (not shown) provided above the diffusion plate in order to guide the diffused light radiated from the diffusion plate in a direction perpendicular to the display panel 58.

Depending on the arrangement structure of the light sources for supplying light to the display panel 58, the back light unit is classified as an edge light type and a direct type. The back light unit as described above is a direct type back light unit. An edge light type back light unit is structured such that the light sources are arranged on the lower side surface of the display panel 58. Therefore, the edge light type back light unit is provided with a light guide plate to guide the light emitted from the light sources to the display panel 58.

In the conventional touch panel display device 1, the touch sensing parts 68 for sensing the infrared light are disposed at upper corners of the display panel 58, frames 64 are provided to be extended along the edges of the display panel 58, and a plurality of infrared light emitting diodes (IR-LEDs) 66a are provided in the frames 64. The IR-LEDs 66a emit infrared light to a surface 60 of the display panel 58. More particularly, the IR-LEDs 66a are arranged on a substrate 66b, and are mounted in the frames 64.

The conventional touch panel display device 1 is constituted such that a user can observe an image displayed on the display panel 58 and can touch a user's desired portion of the panel, to thereby input information. To achieve this, the touch sensing parts 68 for detecting the position touched by a user are provided at the upper corners of the display panel 58.

The infrared light generated from the IR-LEDs 66a shown in FIG. 2 is irradiated to the surface 60 of the display panel 58 via a light guide plate 66c provided at a light output surface of the frame 64. The light guide plate 66c serves to expand an irradiation range of the infrared light emitted from the IR-LEDs 66a. The light guide plate 66c may be generally configured as a film or lens.

As shown in FIGS. 2 and 3, the infrared light emitted from the IR-LEDs 66a passes through the light guide plate 66c, so that the irradiation range of the infrared light is expanded. Then, the infrared light is irradiated to the surface 60 of the display panel 58. A reference numeral 72 in FIG. 3 denotes that the irradiation range of the infrared light is expanded by the light guide plate 66c.

By the above constitution, the infrared light generated from the IR-LEDs 66a is irradiated to the surface 60 of the display panel 58. If a user observes an image displayed on the display panel 58 and touches a certain portion at which user's desired information is displayed, the infrared light incident on the touch sensing parts 68 including image sensors is interrupted.

The image sensors included in the touch sensing parts 68 are provided with infrared pass filters (IR-Pass Filters) to interrupt visible light and sense infrared light. As shown in FIG. 4, when a user does not touch the panel, because the infrared light is incident on the image sensors, a white image is inputted.

If a user touches the touch panel, the infrared light is interrupted by a user's finger, and thus a black image is inputted to the image sensors.

The touch panel display device 1 using infrared light analyzes an image of the object touching the panel by generally using two or more image sensors. Thereafter, an angle of the image and coordinates are derived using a triangulation method, and a portion of the display panel 58 corresponding to the coordinates, i.e., a portion of the display panel 58 touched by a user is detected. As a result, a touched position is determined.

The conventional touch panel display device 1 as constituted above includes a plurality of IR-LEDs 66a in order to accurately detect the position touched by a user and improve touch sensitivity.

Thus, the above conventional touch panel display device 1 has problems of high power consumption and high manufacturing costs. Moreover, the number of IR-LEDs 66a is more increased as the display panel of a larger scale is produced. Accordingly, the power consumption and manufacturing costs are considerably increased.

SUMMARY OF THE INVENTION

Because the conventional touch panel display device includes a plurality of infrared lamps provided on the rear surface of the liquid crystal panel in order to accurately detect a position touched by a user, the conventional device has problems of high power consumption and high manufacturing costs. Moreover, because the number of infrared lamps is more increased as the display panel of a larger scale is produced, the power consumption and manufacturing costs are considerably increased.

Accordingly, the present invention is directed to a touch panel display device that substantially obviates one or more problems due to limitations and disadvantages of the related art.

An object of the present invention is to provide a touch panel display device capable of decreasing power consumption and manufacturing costs by reducing the number of image sensors and infrared lamps, and capable of improving touch sensitivity even when a screen has a large scale.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the object and other advantages and in accordance with the purpose of the invention, as embodied and broadly described herein, a touch panel display device comprises: a liquid crystal panel to display an image by regulating transmittance of light supplied from a back light unit; and a touch sensing part provided on upper edges of the liquid crystal panel in order to detect a position touched by a user. The touch sensing part includes: a plurality of infrared lamps to generate and emit infrared light; infrared light reflecting tubes mounted with the infrared lamps, each of the infrared light reflecting tubes having a plurality of light output regions and a plurality of non-output regions evenly formed at a surface facing an upper surface of the liquid crystal panel so that the infrared light emitted from the infrared lamps is evenly irradiated on the upper surface of the liquid crystal panel; and a plurality of image sensors to sense the infrared light emitted from the infrared lamps.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention associated with a touch panel display device, examples of which are illustrated in the accompanying drawings. Wherever possible, the same reference numbers will be used throughout the drawings to refer to the same or like parts.

Figure 1:
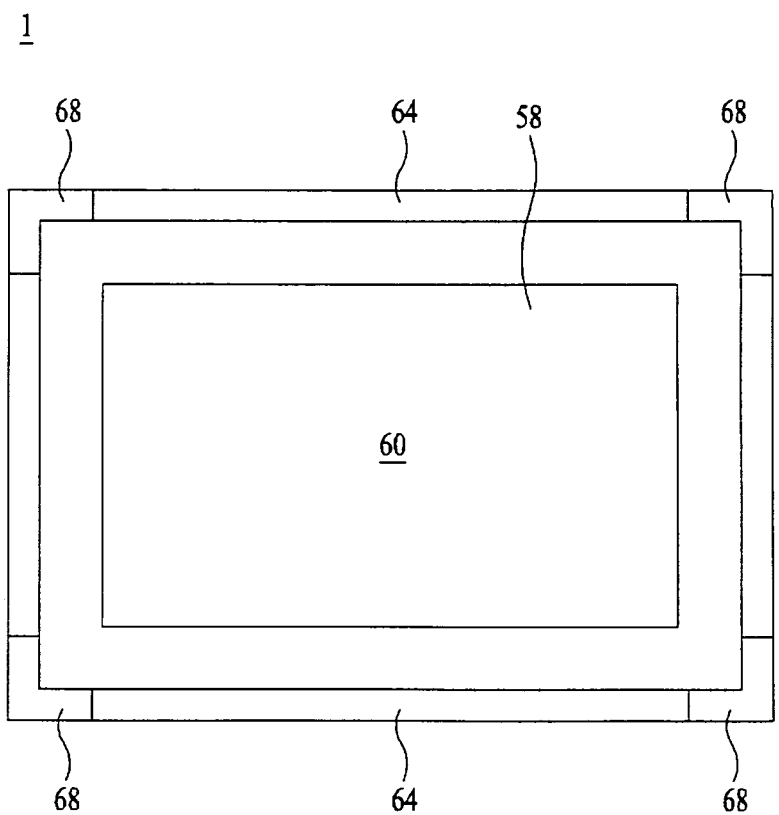
FIG. 1 is a plan view illustrating a conventional touch panel display device.
Figure 2:
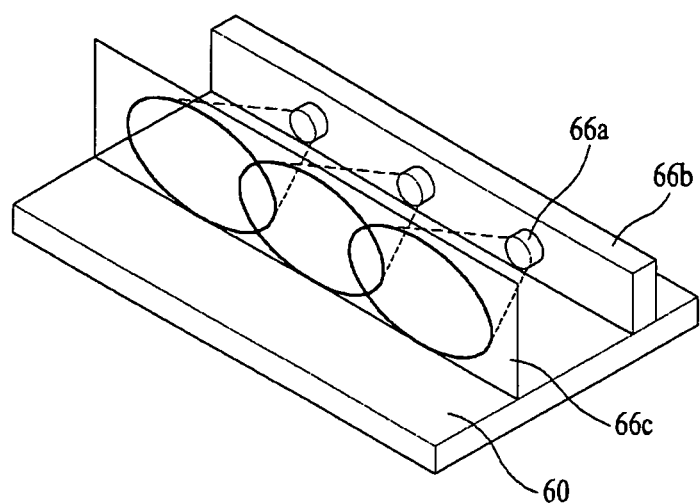
FIG. 2 is a perspective view illustrating infrared light emitting diodes of the conventional touch panel display device.
Figure 3:
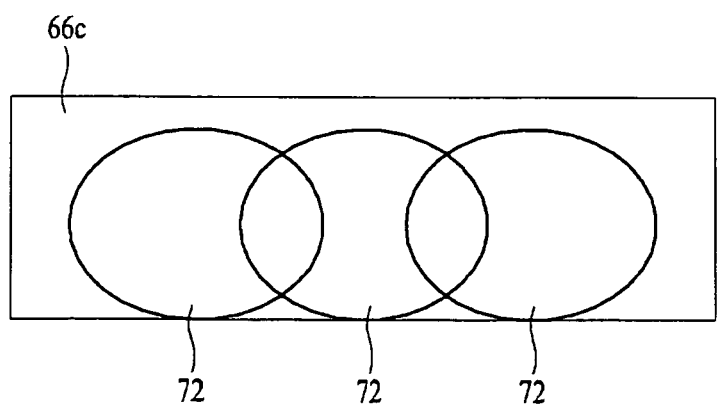
FIG. 3 is a view illustrating ranges of infrared light emitted from the infrared light emitting diodes shown in FIG. 2.
Figure 4:
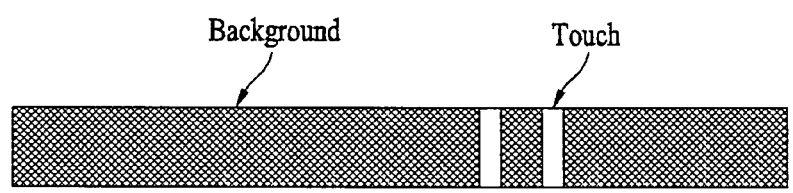
FIG. 4 is a view explaining a method for sensing touch on a touch panel by use of image sensors.
Figure 5:
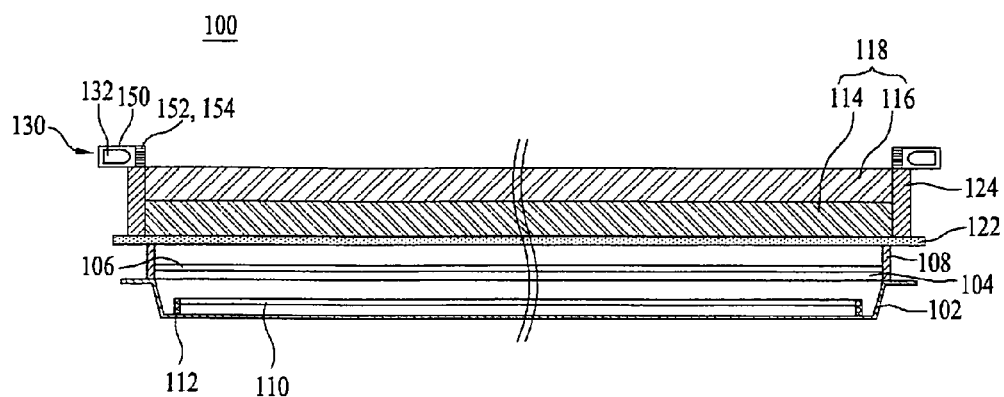
FIG. 5 is a sectional view illustrating a touch panel display device according to the present invention.
Figure 6:
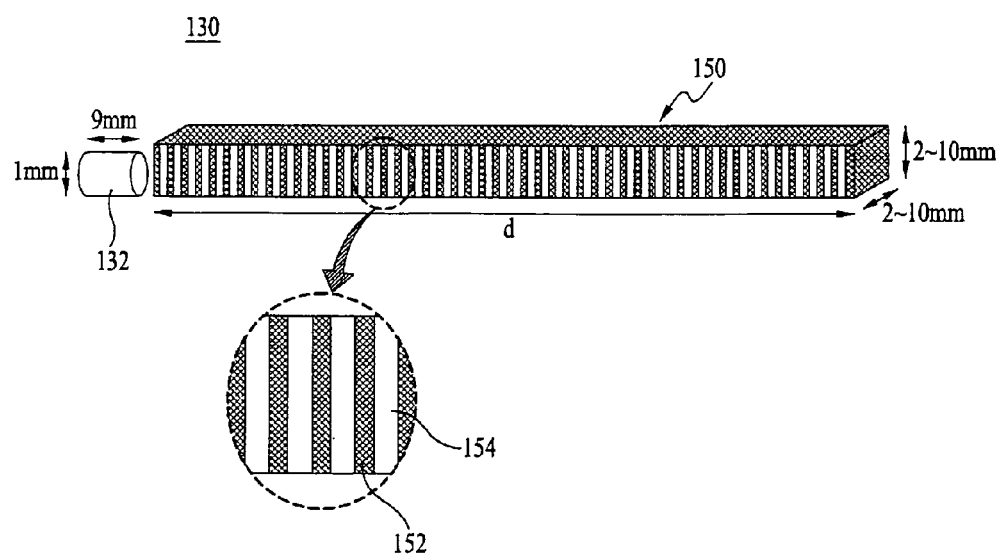
FIG. 6 is a perspective view illustrating a touch sensing part of the touch panel display device according to the present invention.

FIG. 5 is a sectional view illustrating a touch panel display device according to an exemplary embodiment of the present invention, and FIG. 6 is a perspective view illustrating a touch sensing part of the touch panel display device according to an exemplary embodiment of the present invention.

Referring to FIGS. 5 and 6, a touch panel display device 100 according to the present invention includes a back light unit, a liquid crystal panel 118 which receives the light supplied from the back light unit and displays an image by regulating light transmittance, and a touch sensing part 130 provided above a liquid crystal display module including the back light unit and the liquid crystal panel 118.

The back light unit includes a plurality of lamps 110 (light sources) to irradiate light to the liquid crystal panel 118, a bottom cover 102 which is mounted with the lamps 110 and an optical member for guiding the light emitted from the lamps 110 to the liquid crystal panel 118, lamp holders 112 coupled to the bottom cover 102 to support the lamps 110 In this embodiment, the optical member includes diffusion plate 104 to diffuse the light emitted from the lamps 110 to the whole surface of the liquid crystal panel 118, and a plurality of optical sheets 106 provided above the diffusion plate 104 to guide the diffused light radiated from the diffusion plate 104 in a direction perpendicular to the liquid crystal panel 118. In addition, a transparent plate 122 provided above a side frame 108 supports the liquid crystal panel 118.

Each of the lamps 110 for supplying light to the liquid crystal panel 118 is mainly configured as a cold cathode fluorescent lamp, which includes a glass tube, inert gases provided inside the glass tube, and a cathode and an anode respectively provided at both end portions of the glass tube. The inert gases are filled in the glass tube, and a fluorescent substance is coated on the inner wall of the glass tube. The cold cathode fluorescent lamp has been described as the light source for supplying light to the liquid crystal panel 118, however the light source is not limited to the cold cathode fluorescent lamp. A light emitting diode (LED) or other types of light sources used in flat panel display devices can also be applied to the present invention.

As shown in FIG. 5, the touch sensing part 130 is provided at the upper edges of the liquid crystal panel 118, so as to sense user's or an object's touch on the panel.

The liquid crystal panel 118 is disposed above the transparent plate 122. The liquid crystal panel 118 displays an image by regulating transmittance of the light from the back light unit. The liquid crystal panel 118 includes an upper substrate 116 and a lower substrate 114. A liquid crystal is provided between the upper substrate 116 and the lower substrate 114, and a spacer (not shown) is also provided between the upper substrate 116 and the lower substrate 114 in order to maintain a constant gap between the substrates 116 and 114.

Although not illustrated in the drawings, color filters, common electrodes and black matrixes are formed on the upper substrate 116 of the liquid crystal panel 118. Also although not illustrated in the drawings, signal lines such as data lines and gate lines are formed on the lower substrate 114 of the liquid crystal panel 118. Thin film transistors (TFTs, not shown) are formed at intersections of the data lines and the gate lines. The TFTs respond to scan signals (gate driving signals) from the gate lines, and supply analog video signals from the data lines to liquid crystal cells. An upper polarizing sheet is attached to the upper substrate 116 of the liquid crystal panel 118, and a lower polarizing sheet is attached to the back surface of the lower substrate 114.

Although it has been described that the TFT type liquid crystal panel is used in the image display device according to the present invention, an organic light emitting diode (OLED), a plasma display panel (PDP), a surface conduction electron emitter display (SED), a field emission display (FED) or a cathode-ray tube (CRT) can also be applied to the touch panel display device according to the present invention.

The touch panel display device 100 according to the present invention is constituted such that a user can observe an image displayed on the liquid crystal panel 118 and can touch a user's desired portion of the panel 118, to thereby input information. To achieve this, the touch sensing part 130 for detecting the position touched by a user or an object is provided at the upper edges of the liquid crystal panel 118, above a spacer 124.

As shown in FIGS. 5 and 6, the touch sensing part 130 includes a plurality of infrared lamps 132 to generate and emit infrared light, infrared light reflecting tubes 150 which are mounted with the infrared lamps 132 and serve to evenly irradiate the infrared light from the infrared lamps 132 on the upper surface of the liquid crystal panel 118, and a plurality of image sensors 160 to sense the infrared light emitted from the infrared lamps 132. In one embodiment, the infrared lamps 132 can be light emitting diodes, but not limited.

The infrared lamps 132 are installed inside the infrared light reflecting tubes 150.

Each of the infrared light reflecting tubes 150 containing the plurality of infrared lamps 132, as shown in FIG. 6, is formed in a long rectangular parallelepiped shape, and has a width of 2 to 10 mm and a height of 2 to 10 mm. A length of each infrared light reflecting tube 150 may be changed depending on a size of the liquid crystal panel 118.

Also, the width and height of each infrared light reflecting tube 150 may be changed depending on a size of the infrared lamps 132 provided inside the infrared light reflecting tube 150.

The infrared light reflecting tube 150 is made of a material capable of reflecting infrared light, in order to decrease loss of the infrared light generated from the infrared lamps 132. The whole area of the infrared light reflecting tube 150 may be made of a material capable of reflecting infrared light, or only an inner surface of the infrared light reflecting tube 150, to which the infrared light is irradiated, may be coated with a reflective sheet or a reflective material.

One surface of the infrared light reflecting tube 150 includes a plurality of slits, through which the infrared light generated from the infrared lamps 132 can be irradiated outside. Describing in detail, the infrared light irradiated into the infrared light reflecting tube 150 is totally reflected from the reflective sheet or the reflective material provided on the inner surface of the infrared light reflecting tube 150.

So as for the infrared light reflected from the inner surface of the infrared light reflecting tube 150 to be irradiated outside, a plurality of slits are formed at the surface of the infrared light reflecting tube 150, which face the upper surface of the liquid crystal panel 118, and light output regions 154 are defined by the slits, so that the infrared light can be irradiated outside through the light output regions 154. If the infrared light irradiated into the infrared light reflecting tube 150 is incident on non-output regions 152 made of a reflective material, the infrared light is successively reflected. If the infrared light is incident on the light output regions 154 defined by the slits, the infrared light is outputted (irradiated) outside, i.e., to the upper surface of the liquid crystal panel 118.

Figure 8:
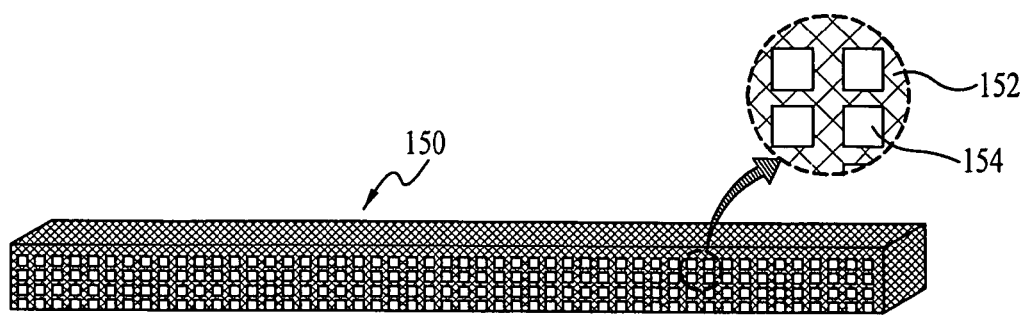
Figure 9:
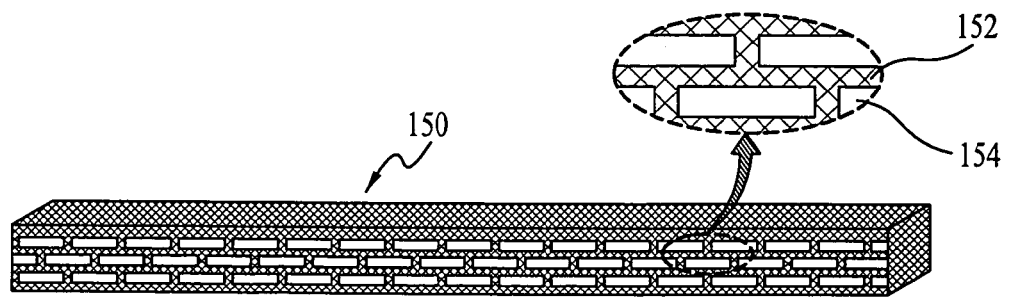

It is illustrated in FIG. 6 that each of the slits formed at the infrared light reflecting tube 150 is formed in a long rectangular shape extended in a vertical direction, however as shown in FIG. 8, the light output regions 154 may be defined by square-shaped slits which are evenly arranged at the whole surface of the infrared light reflecting tube 150. Alternatively, as shown in FIG. 9, the light output regions 154 and the non-output regions 152 may be defined by slits which are formed like bricklaying.

Figure 7:
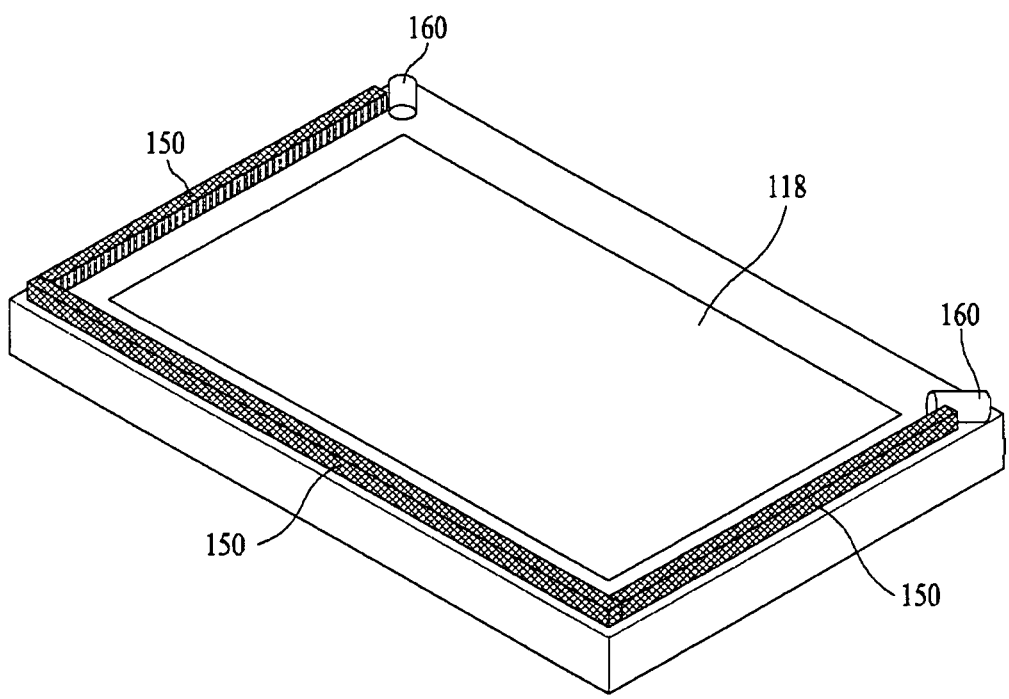
FIGS. 7 to 9 are views illustrating an infrared light reflecting tube of the touch panel display device according to the present invention.

As shown in FIG. 7, the infrared light reflecting tubes 150, each of which has the slits formed at the surface facing the upper surface of the liquid crystal panel 118, are arranged in a "U" shape along the upper edges of the liquid crystal panel 118, except for the upper edge mounted with the image sensors 160, so as to evenly irradiate the infrared light to the upper surface of the liquid crystal panel 118.

As described above, the touch panel display device 100 according to the present invention includes the infrared light reflecting tubes 150, each of which has the light output regions and the non-output regions defined by the slits formed at the surface facing the upper surface of the liquid crystal panel 118. Accordingly, the infrared light can be evenly irradiated to the upper surface of the liquid crystal panel 118 by use of the smaller number of infrared lamps 132 than a conventional touch panel display device. Further, the infrared light can be evenly irradiated to the upper surface of the liquid crystal panel 118 without a light guide plate used in a conventional touch panel display device.

In the touch panel display device 100 according to the present invention as constituted above, if a user observes an image displayed on the liquid crystal panel 118 and touches a portion of the panel, on which user's desired information is displayed, the user's touch on the panel is detected by the image sensors 160.

The image sensors 160 are provided with infrared pass filters (IR-Pass Filters). When a user or an object does not touch the liquid crystal panel 118, the infrared light emitted from the infrared lamps 132 is incident on the image sensors 160 through the IR-Pass Filters, and a white image is inputted to the image sensors 160.

On the other hand, if a user or an object touches the liquid crystal panel 118, the infrared light is interrupted by a user's finger or an object and cannot be incident on the image sensors 160, and a black image is inputted to the image sensors 160.

The touch panel display device 100 according to the present invention using infrared light analyzes an image of the object touching the panel by use of two or more image sensors 160. Thereafter, an angle of the image and coordinates are derived using a triangulation method, and a portion of the liquid crystal panel 118 corresponding to the coordinates, i.e., a portion of the liquid crystal panel 118 touched by a user or an object is detected. As a result, a touched position is determined.

The above-described touch panel display device according to the present invention obviates shortcomings (high power consumption and high manufacturing costs) of a conventional touch panel display device, in which a plurality of infrared lamps are disposed together with light sources of a back light unit to obtain precise touch sensitivity and whether or not a user or an object touches the panel or a touched position is detected by use of a light guide plate. In other words, the touch panel display device according to the present invention can achieve precise touch sensitivity while reducing power consumption and manufacturing costs by using the smaller number of infrared lamps and eliminating a light guide plate.

The liquid crystal panel 118 is formed in a rectangular shape including four sides. The image sensors 160 provided on the upper edges of the liquid crystal panel 118 may be positioned on any one of the four sides of the liquid crystal panel 118, or may be positioned on corners at which the adjacent sides of the liquid crystal panel 118 join.

Figure 10:
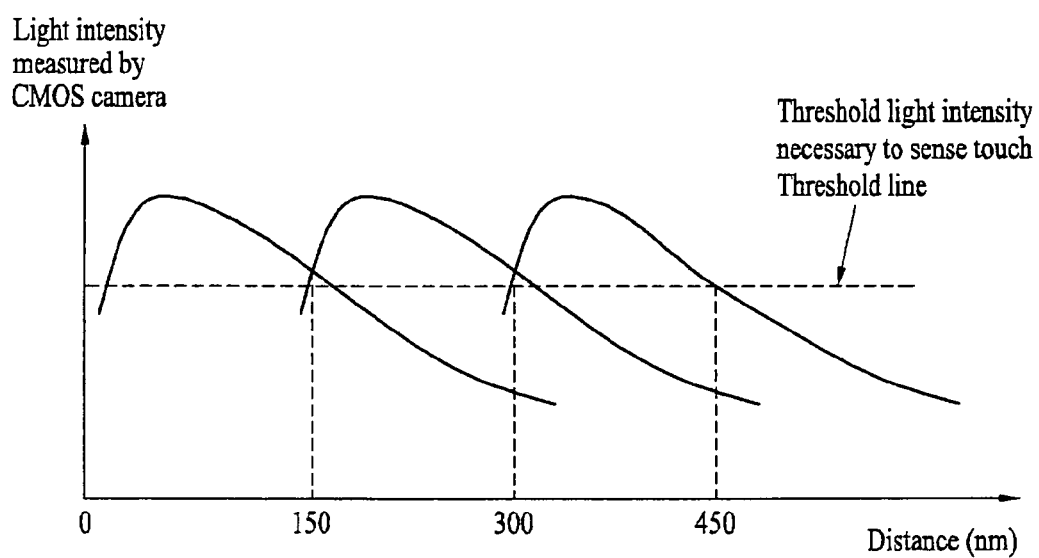
FIG. 10 is a view illustrating an intensity of infrared light, emitted from infrared lamps, depending on a distance.
Figure 11:
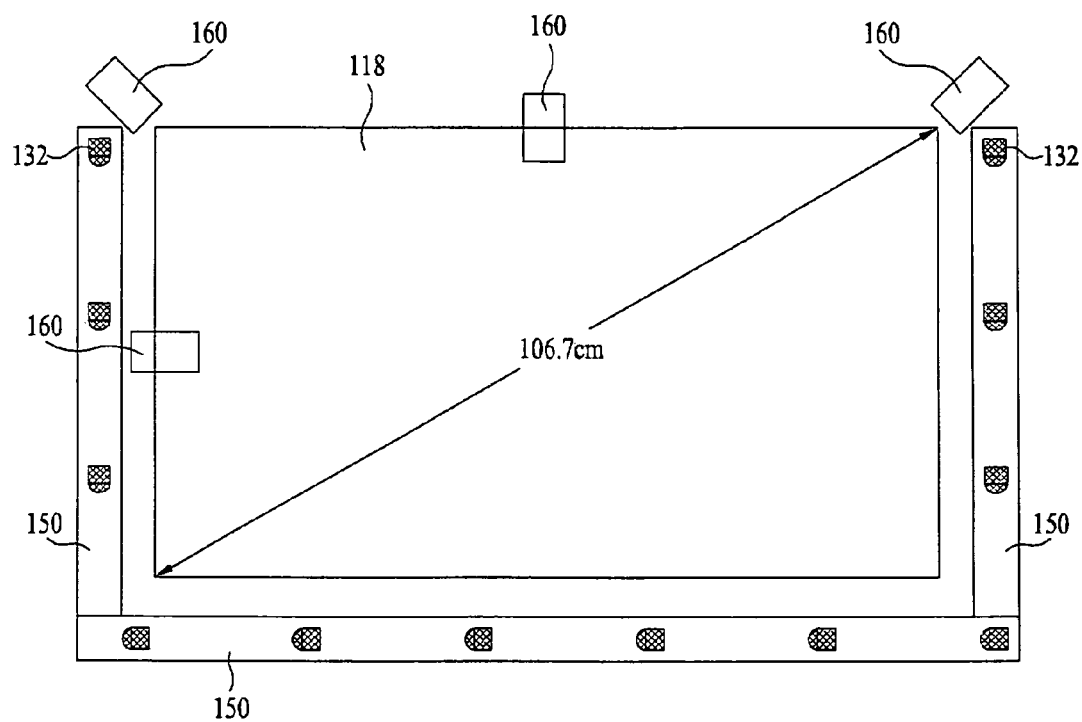
FIG. 11 is a view illustrating arrangement of infrared lamps and image sensors, which is adequate for a large-scaled screen.

FIG. 10 is a view illustrating an intensity of the infrared light, emitted from the infrared lamps, depending on a distance, and FIG. 11 is a view illustrating arrangement of the infrared lamps and the image sensors, which is adequate for a large-scaled screen.

As described above, there is a growing trend to produce a large-scaled display device, and accordingly a large-scaled touch panel display device is also being developed. With the progress of the large-scaled display panel, a user or an object can more conveniently touch a portion of the panel, on which user's desired information is displayed. However, as shown in FIG. 10, the large-scaled touch panel may have a problem such that an intensity of the infrared light emitted from the infrared lamps becomes weak depending on a distance and sensitivity to the user's or the object's touch is deteriorated.

To solve such a problem, as shown in FIG. 11, the touch panel display device according to the present invention is structured such that the infrared lamps 132 are additionally provided at positions, at which the intensity of the infrared light emitted from the infrared lamps 132 drops below a threshold by which the image sensors 160 can sense the user's or the object's touch. As a result, even a large-scaled touch panel display device (e.g., 42 inches) can have high sensitivity to the user's or the object's touch.

Figure 12:
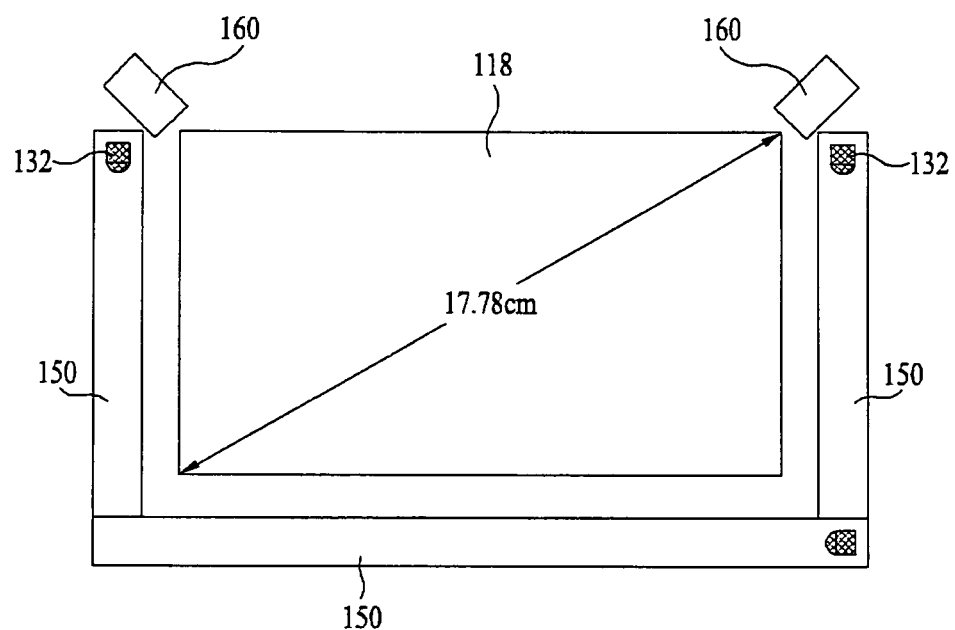
FIG. 12 is a view illustrating arrangement of infrared lamps and image sensors, which is adequate for a small-scaled screen.

As shown in FIG. 12, in a small-scaled touch panel display device (e.g., 7 inches), the arrangement of only one or two infrared lamps 132 at the end portion of each infrared light reflecting tube 150 can satisfy the threshold condition by which the image sensors 160 can sense the user's or the object's touch. However, the high touch sensitivity cannot be maintained by only one or two infrared lamps 132 in the large-scaled display panel. This is because the intensity of the infrared light emitted from the infrared lamps 132 is decreased in inverse proportion to the increase in distance (refer to FIG. 10).

The graph of FIG. 10, which shows a relation between the infrared light intensity and the distance, is obtained from a measuring test using an infrared light emitting diode having an output of 160 to 200 mW. Based on the test results, the touch panel display device according to the present invention is structured such that the infrared lamps 132 are arranged at a regular gap of 150 mm therebetween in a longitudinal direction of the infrared light reflecting tube 150. Further, in order to maintain the higher sensitivity to the user's or the object's touch, the image sensors 160 are additionally provided at a center portion in a width or longitudinal direction as well as the corners of the display device.

Although it has been described with reference to FIGS. 10 and 11 that the infrared lamps 132 are arranged at a gap of 150 mm therebetween, the gap between the infrared lamps may be changed depending on the output of the infrared lamps 132. For example, if the output of each infrared light emitting diode 132 is lower than the output of 160 to 200 mW of the infrared light emitting diode used in the aforementioned measuring test, the gap between the infrared lamps 132 becomes smaller than 150 mm. On the other hand, if the output of each infrared light emitting diode 132 is higher than the output of 160 to 200 mW, the gap becomes larger than 150 mm.

As described above, the touch panel display device according to the present invention is structured such that the infrared lamps 132 are additionally provided at the positions, at which the intensity of the infrared light emitted from the infrared lamps 132 drops below a threshold by which the image sensors 160 can sense the user's or the object's touch. As a result, even a large-scaled touch panel display device can have high sensitivity to the user's or the object's touch.

Moreover, the touch panel display device according to the present invention can optimize the number of infrared lamps 132 and image sensors 160 adequately for the size of the touch panel, and can evenly irradiate the infrared light generated from the optimum number of infrared lamps 132 to the whole upper surface of the liquid crystal panel 118, even though the liquid crystal panel 118 has a large scale. As a result, even a large-scaled touch panel display device can achieve precise touch sensitivity while reducing power consumption and manufacturing costs by using the relatively small number of infrared lamps 132 and eliminating a light guide plate.

The touch panel display device according to the present invention, as described above, has the following effects.

First, power consumption and a product price can be decreased by remarkably reducing the number of infrared lamps, when compared to a conventional touch panel display device in which infrared lamps are mounted in a back light unit.

Second, even a large-scaled panel can have high touch sensitivity with the reduced number of infrared lamps and image sensors.

Third, a product price can be decreased by eliminating an expensive light guide plate used in a conventional touch panel display device.

Fourth, a product becomes solid and a manufacturing efficiency is enhanced by reducing the number of infrared lamps and image sensors and eliminating a light guide plate used in other types of touch panel display devices.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch panel display device comprising:
    a liquid crystal panel to display an image by transmittance of light supplied from a back light unit; and
    a touch sensing part provided on upper edges of the liquid crystal panel in order to detect a position touched by a user or an object,
    wherein the touch sensing part includes:
        a plurality of infrared lamps to generate and emit infrared light;
        infrared light reflecting tubes mounted with the infrared lamps, each of the infrared light reflecting tubes having a plurality of light output regions and a plurality of non-output regions formed at a surface facing an upper surface of the liquid crystal panel so that the infrared light emitted from the infrared lamps is irradiated on the upper surface of the liquid crystal panel; and
        a plurality of image sensors to sense the infrared light emitted from the infrared lamps;
        a plurality of additional infrared lamps provided at certain positions of the infrared light reflecting tubes, wherein the certain positions correspond to where the intensity of the infrared light emitted from the infrared lamps drops below a threshold by which the image sensors sense a user's or object's touch;
    wherein the plurality of light output regions and the plurality of non-output regions are formed along the length of the infrared light reflecting tubes;
    wherein the infrared light emitted from the infrared lamps is irradiated along the length of the infrared light reflecting tubes, and
    wherein the plurality of non-output regions are entirely made of a material reflecting infrared light;
    wherein the plurality of light output regions comprise a first light output regions poisoned at a first row of the infrared light reflecting tubes, second light output regions poisoned at a second row of the infrared light reflecting tubes and third light output regions poisoned at a third row of the infrared light reflecting tubes;
    wherein both a portion of one second light output region and a portion of the other second light output region are positioned between the corresponding first output region and third output region facing each other;
    wherein the one second output region is adjacent with the other second output region;
    wherein one first light output region positioned at the end of the infrared light reflecting tubes is smallest among the first output regions;
    wherein one third light output region positioned at the end of the infrared light reflecting tubes is smallest among the third output regions.

2. The touch panel display device according to claim 1, wherein each of the infrared light reflecting tubes is formed in a rectangular parallelepiped shape.

3. The touch panel display device according to claim 1, wherein each of the light output regions formed at the surface of each of the infrared light reflecting tubes has a rectangular shape.

4. The touch panel display device according to claim 1, wherein the image sensors are disposed on the upper edges of the liquid crystal panel.

5. The touch panel display device according to claim 4, wherein the liquid crystal panel is formed in a rectangular shape including four sides,
    and wherein the image sensors provided on the upper edges of the liquid crystal panel are positioned on any one of the four sides of the liquid crystal panel, or are positioned on corners at which the adjacent sides of the liquid crystal panel join.

6. The touch panel display device according to claim 1, further comprising:
    at least one of the image sensors is disposed on a center portion of each of the upper edges of the liquid crystal panel.

7. The touch panel display device according to claim 1, wherein the inner surface of the infrared light reflecting tubes to which the infrared light is irradiated, is coated with a reflective material.

8. The touch panel display device according to claim 1, wherein the back light unit comprising:
    a plurality of lamps to irradiate light to the liquid crystal panel;
    a bottom cover mounted with lamps and an optical member for guiding the light emitted from the lamps to a liquid crystal display;
    lamp holders coupled to the bottom cover to support the lamps;
    a side frame positioned above the bottom cover;
    a transparent plate provided above the side frame to support the liquid crystal panel; and
    a spacer provided above the transparent plate;
        wherein the infrared light reflecting tubes are provided above the spacer.

9. The touch panel display device according to claim 1, wherein each of the infrared light reflecting tubes has a width of 2 to 10 mm and a height of 2 to 10 mm.

10. The touch panel display device according to claim 1,
wherein the infrared lamps have an output of 160 to 200 mW; and
wherein the infrared lamps are arranged at a regular gap of 150 mm therebetween in a longitudinal direction of the infrared light reflecting tubes.

* * * * *